United States Patent
Kume et al.

[11] Patent Number: 6,100,658
[45] Date of Patent: Aug. 8, 2000

[54] WINDOW OPENING AND CLOSING APPARATUS

[75] Inventors: Masato Kume; Noritaka Ohiro, both of Aichi-ken, Japan

[73] Assignee: Toyota Jidosha Kabushiki Kaisha, Toyota, Japan

[21] Appl. No.: 09/080,469

[22] Filed: May 19, 1998

Related U.S. Application Data

[63] Continuation of application No. PCT/JP97/01821, May 29, 1997.

[30] Foreign Application Priority Data

Jun. 7, 1996 [JP] Japan .................................. 8-145325
Jun. 7, 1996 [JP] Japan .................................. 8-145410

[51] Int. Cl.$^7$ .............................. B60J 1/17; E05F 15/16
[52] U.S. Cl. ........................... 318/286; 318/266; 318/469
[58] Field of Search .................................. 318/264, 265, 318/266, 286, 466, 467, 468, 469, 280

[56] References Cited

U.S. PATENT DOCUMENTS

| | | | |
|---|---|---|---|
| 4,641,067 | 2/1987 | Iizawa et al. | 318/287 |
| 5,351,439 | 10/1994 | Takeda et al. | 49/28 |
| 5,436,539 | 7/1995 | Wrenbeck et al. | 318/265 |
| 5,459,379 | 10/1995 | Takeda et al. | 318/469 |
| 5,483,133 | 1/1996 | Takabe et al. | 318/466 |
| 5,525,876 | 6/1996 | Flippi | 318/282 |
| 5,689,160 | 11/1997 | Shigematsu et al. | 318/281 |
| 5,734,245 | 3/1998 | Terashima et al. | 318/453 |
| 5,801,501 | 9/1998 | Redelberger | 318/283 |

FOREIGN PATENT DOCUMENTS

| | | |
|---|---|---|
| 61-222843 | 10/1986 | Japan . |
| 5-95694 | 4/1993 | Japan . |
| 7-87770 | 3/1995 | Japan . |
| 8-149871 | 6/1996 | Japan . |
| 8-254072 | 10/1996 | Japan . |
| 9-32414 | 2/1997 | Japan . |
| 9-125815 | 5/1997 | Japan . |

*Primary Examiner*—Bentsu Ro
*Attorney, Agent, or Firm*—Pillsbury Madison & Sutro LLP

[57] ABSTRACT

A rotational speed sensor generates pulses having a period proportional to the speed of a motor, while a pulse period calculator section calculates the period of the pulses. A jamming determination section calculates the motor load based on the pulse period and detects that an object is jammed when the load exceeds a predetermined threshold. Once it has been judged than an object is jammed, a drive control section stops and controls the motor for reverse rotation, thereby releasing the object. A door opening and closing detection section further detects the opening or closing operation of a door which is one disturbance factor. If the door is opened or closed, an inhibit control section inhibits jamming judgment for a predetermined period of time thereafter. This prevents an incorrect judgment due to the opening or closing of the door.

15 Claims, 11 Drawing Sheets

WINDOW OPENING AND CLOSING APPARATUS

This is a continuation of International Application No. PCT/JP97/01821 filed May 29, 1997 which designated the U.S.

BACKGROUND OF THE INVENTION

1. Field of the Invention

The present invention relates to a window opening and closing apparatus using a motor drive, and more particularly to a window opening and closing apparatus that is capable of detecting a jamming object during the opening and closing operations.

2. Description of Related Art

A representative technique among those known for opening and closing a window with a motor is the so-called "power windows" where a side window of a vehicle is opened and closed with a motor. When automatically opening or closing a window by motor drive, it becomes necessary to perform a control operation, such as for stopping the opening or closing operation, when an object is jammed between the moving window and the window frame. This is done to prevent damage, either to the object itself or to the window, or a mechanism for opening or closing the window.

This sort of technique for detecting the jamming of an object is disclosed in Japanese Patent Laid-Open Publication No. Hei 5-95694. In this technique, pulses proportional to the rotational speed of the motor are generated and the jamming of an object is detected from a change in the period of the pulses. Namely, when an object is jammed, the load on the motor increases so that its rotational speed decreases, and jamming is detected through this decrease in rotational speed.

However, in an apparatus for opening and closing a window installed in a door, such as the side window of a vehicle, a decrease in the rotational speed of the motor may be caused by factors other than a jammed object. These other factors could even include the impact caused by normal opening and closing of the door. Furthermore, if the window is provided in a vehicle door, vibrations of the vehicle body due to the characteristics of the road surface on which the vehicle is traveling, especially the irregularities in the road surface, can also become the above-mentioned disturbances. When judging the jamming of an object from the rotational speed of the motor, as in the above-mentioned apparatus of the prior art, a problem exists in that a change in the rotational speed of the motor caused by the factors mentioned above will also be judged to be due to a jammed object.

As a specific example, when the door is opened or closed during the opening or closing of the window glass in a vehicle having power windows, the change in motor rotational speed accompanying the door opening or closing operation is incorrectly judged to be due to a jammed object jam. Furthermore, if the opening or closing operation of the window is performed when vehicle body vibrations are large due to the road surface, such as the vibrations that are caused by traveling over a rough road, the change in motor rotational speed due to vehicle body vibrations is incorrectly judged to be due to a jammed object.

SUMMARY OF THE INVENTION

The present invention solves the above-mentioned problem by providing a window opening and closing apparatus which eliminates an incorrect determination that an object is jamming the window.

In order to achieve this object in, the window opening and closing apparatus relating to the present invention uses a motor to open and close a window glass installed in a door. The apparatus comprises a means for detecting the rotational speed of the motor, a means for detecting a disturbance factor that causes an abnormal change in the rotational speed of the motor besides when the window glass jams an object, a means for determining based on the disturbance factor that the window glass has jammed an object, and a control means for at least inhibiting the movement of the window glass, if object jamming was determined, at the time object jamming was determined.

According to this configuration, it is possible to prevent an incorrect determination that an object is obstructing the window when the rotational speed of the motor changes abnormally because of a disturbance factor, and not because the window glass is obstructured by a jammed object. Incorrect judgment of an object jam is thereby prevented.

Furthermore, with the above-mentioned disturbance factor considered to be the door opening or closing operation, the disturbance factor detection means can be used as a door opening or closing operation detection means. The impact generated from the opening or closing of the door causes a fluctuation in the rotational speed of the motor. However, because the opening or closing of the door was also included in the determining factor of object jamming, an incorrect judgment caused by the opening or closing of the door can be prevented.

Furthermore, the jam determination means may also include an inhibit control means for inhibiting a jamming determination for a predetermined period when the door opening or closing operation is detected. After the door is opened or closed, the determination of object jamming is inhibited for a predetermined period thereby preventing incorrect judgment during this period.

The jamming determination means determines that jamming has occurred when a value that is calculated from the rotational speed of the motor exceeds a predetermined threshold. The jamming determination means may include a means for modifying the threshold for a predetermined time when the opening or closing of the door has been detected. By modifying the threshold for jamming determination for a predetermined time after the door has been opened or closed, incorrect judgment during this period can be prevented. If a value greater than or equal to the modified threshold is calculated, a judgment of whether an object is jammed is made even before the predetermined period has elapsed.

With the door installed on the vehicle and the disturbance factor being an input from a road surface on which the vehicle is traveling caused by the characteristics of the road surface, the window opening and closing apparatus may further comprise means for evaluating the characteristics of the road surface.

According to this configuration, the determination of an object jam is performed while including road surface characteristics. For example, during travel on a rough road, which is one road surface characteristic, the input from the road surface caused by irregularities in the road surface enables a control operation to be performed so that, even if the rotational speed of the motor fluctuates, any such fluctuation is not mistaken as a change in the rotational speed due to object jamming. This control is especially effective when a driver attempts to close a rear seat window while traveling on a rough road. The window at the rear seat is located in a position that is difficult for the driver to see, thus making it difficult to confirm an open or closed state during travel. If a vibration from traveling on a rough road is mistaken for an object being jammed, the window will not close, even though a control operation to close the window is attempted. Because the driver cannot easily confirm whether the window is open or closed, the driver cannot recognize that the window is not completely closed and the window will remain open for a long period. In the present invention, mistaking the vibration from the road surface for object jamming is prevented. Thus, when a control operation is performed to close the window, the window is reliably closed completely so that the control operation agrees with the desire of the driver.

Furthermore, the jamming determination means determines that jamming has occurred when a value that is calculated from the rotational speed of the motor exceeds a predetermined threshold and may include a means for modifying the threshold modified according to the characteristics of the road surface. Because, according to this configuration, the threshold to be used for jamming determination is modified according to the characteristics of the road surface, incorrect judgment of object jamming due to input from the road surface can be prevented. When there is a fluctuation in the motor rotational speed that is greater than or equal to the modified threshold, object jamming judgment is made, even while traveling on a rough road during this time.

Furthermore, the road surface characteristic evaluation means can evaluate the characteristics of the road surface based on changes in the rotational speed of the motor. As a result, it is not necessary to provide other configurations to evaluate the road surface characteristic, and any associated increase in cost can be curbed.

Furthermore, a window opening and closing apparatus according to another embodiment of the present invention for opening and closing by a motor a window installed in a door of a vehicle may include a means for detecting the rotational speed of the motor, a means for evaluating the characteristics of the road surface on which the vehicle is traveling based on the rotational speed of the motor, a means for controlling the drive of the motor according to the characteristics of the road surface, a jamming determination means, and a means for inhibiting jamming determination for a predetermined period when the door opening or closing operation has been detected. According to this configuration, the window can be controlled to meet the characteristics of the road surface.

Furthermore, in the above-mentioned embodiments, the motor speed detection means may include a means for generating pulses at a period proportional to the motor speed and pulse period calculation means for calculating the period of the pulses so that the pulse period can be detected as the rotational speed of the motor. The jam determination means may calculate the motor load based on the pulse period so that an object jam can be determined on the basis of the motor load and the above-mentioned disturbance factor.

DESCRIPTION OF THE PREFERRED EMBODIMENTS

Figure 1:
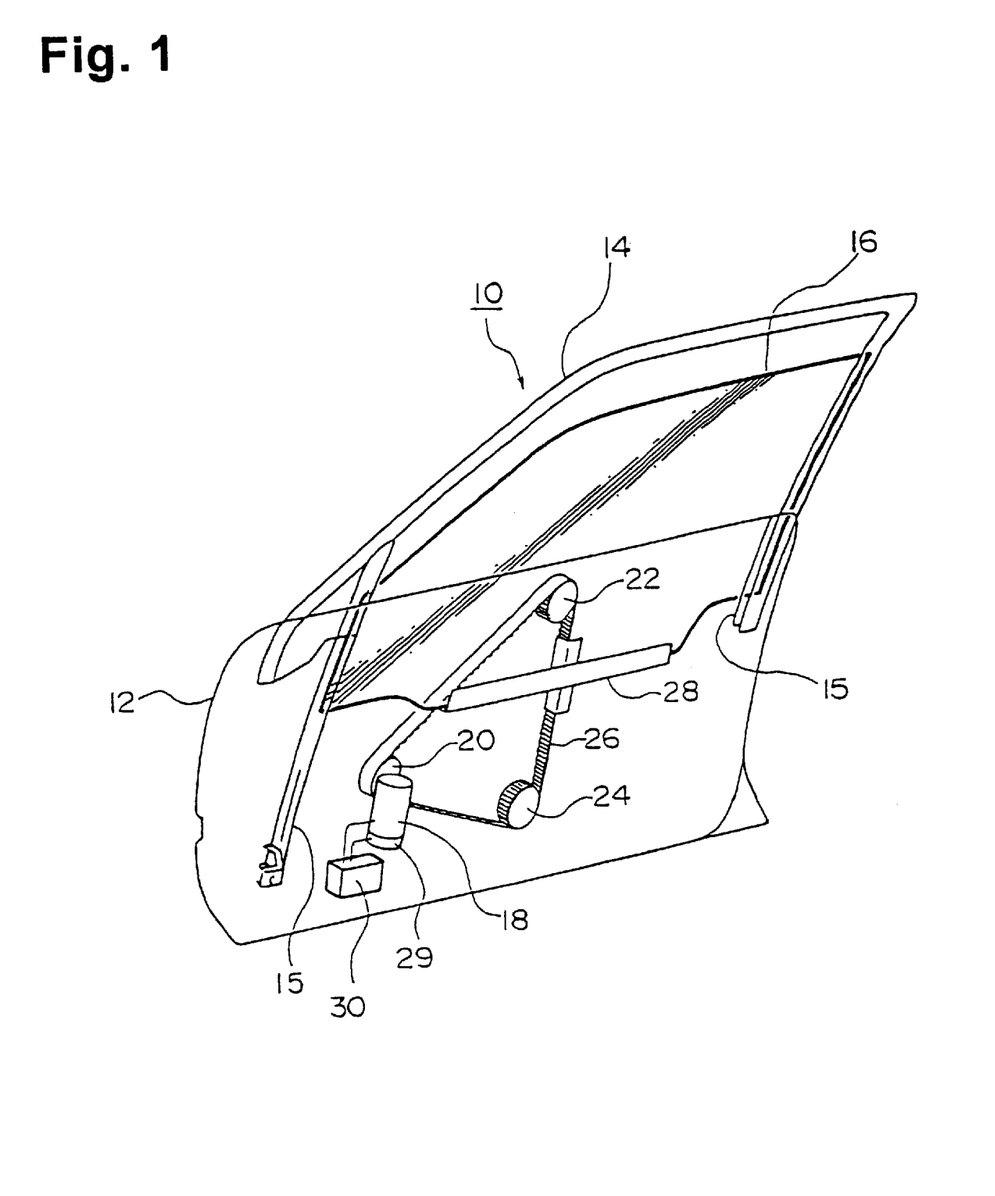
FIG. 1 is a schematic drawing of a window opening and closing apparatus concerning the present invention.

Embodiments of the present invention will be described in the following with reference to the drawings. FIG. 1 shows a schematic drawing of a power window for a vehicle. A door 10 of the vehicle comprises a body 12, a sash 14, and a window glass 16 that slides along a guide rail 15. In an open state, the window glass 16 is primarily housed in the body, and from this state moves to a position contacting against the sash 14 for a closed state. The window opens and closes as driven by a motor 18. The motor 18 is installed within the body 12 and oriented so that its drive shaft lies substantially within the page plane of FIG. 1. The rotation of the motor drive shaft is transmitted, such as through a worm gear, to a toothed drive pulley 20 comprising a rotating shaft that is perpendicular to the page plane. A toothed belt 26 has been placed around the drive pulley 20 and two driven pulleys 22, 24, which are arranged at the top and bottom within the door body. A support bracket 28, which supports a bottom edge of the window glass is further secured onto the toothed belt 26. Therefore, the toothed belt 26 rotates with the rotation of the motor, thereby raising and lowering the support bracket 28 between the driven pulleys 22, 24. This accomplishes the opening and closing of the window glass.

If, in this type of power window, an object is jammed between the window glass and sash while the window glass is being closed and the close operation continues further, the jammed object, the window, or even the drive mechanism for the window with the motor may become damaged.

Furthermore, it is possible for the object to be drawn into the door pocket within the door body along with the window glass during the opening operation, resulting in the object becoming jammed between the door body and glass. The damage mentioned above, such as to the object and the like, is also possible in this case. In this embodiment, object jamming as described above is detected, and when a jam is detected, the motor is controlled accordingly.

In order to detect the rotational speed of the motor, on the motor is installed a rotational speed sensor 29 for generating a predetermined number of rectangular pulses per rotation. Therefore, this rotational speed sensor 29 functions as a means for pulse generation. An output of this rotational speed sensor 29 is transmitted to a control section 30.

Figure 2:
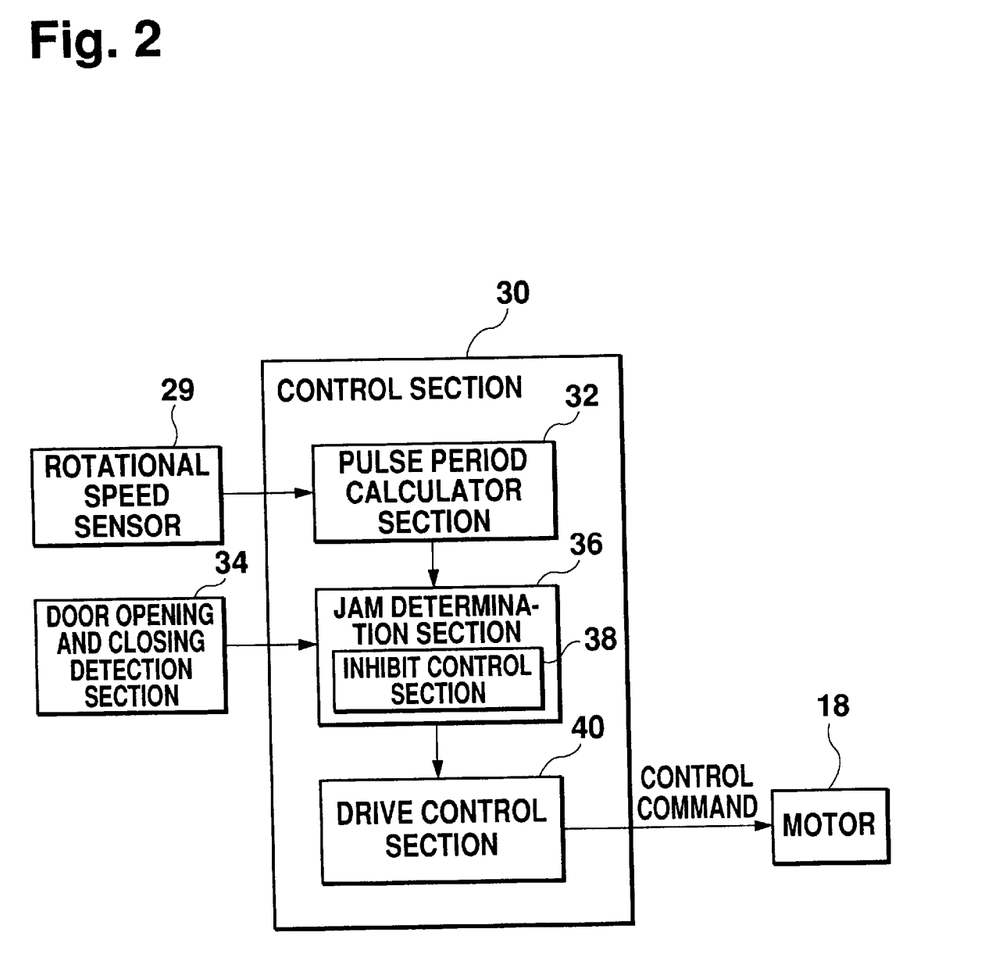
FIG. 2 is a block diagram of an embodiment of the present invention.

The control section 30 has a configuration shown in FIG. 2. A pulse period calculator section 32 calculates the period of pulses based on the pulses from the rotational speed sensor 29. A door opening and closing detection section 34 detects whether or not the door opening or closing operation was performed. This door opening and closing detection section 34 preferably comprises an existing courtesy switch for detecting whether the door is in an open or closed state, and a detection section for detecting the leading edge or trailing edge in an output of the courtesy switch. When there is a leading edge or trailing edge in the output of the courtesy switch, there was a door opening or closing operation.

A jamming determination section 36 determines, based on the above pulse period and a signal from the door opening and closing detection section 34, whether or not an object is jammed between the window glass 16 and window frame. Described in more detail, the jamming determination section 36 calculates the load on the motor 18 from the period of the pulses from the rotational speed sensor 29 (the load calculation method is described later), and judges that an object is jammed when the load exceeds a preset threshold. However, as described above, the impact generated by the opening or closing operation of the door 10 causes the load on the motor 18 to fluctuate. Because this load fluctuation causes the rotational speed of the motor to change, the jamming determination section 36 includes an inhibit control section 38 for inhibiting jamming determination for a predetermined time when the door opening or closing operation is performed.

When jamming determination is made by the jamming determination section 36, a drive control section 40 transmits control commands to the motor 18, to first stop, and to then rotate in a direction opposite to that of the current rotation for a predetermined time. Thus, if an object is jammed, such as between the window glass 16 and sash 14, the movement of the window glass 16 immediately stops, then reverses so that the jammed object is released. When door opening or closing operation is performed, jamming determination is inhibited for a predetermined time thereby preventing the load fluctuation of the motor at this time from being determined as object jamming.

Figure 3:
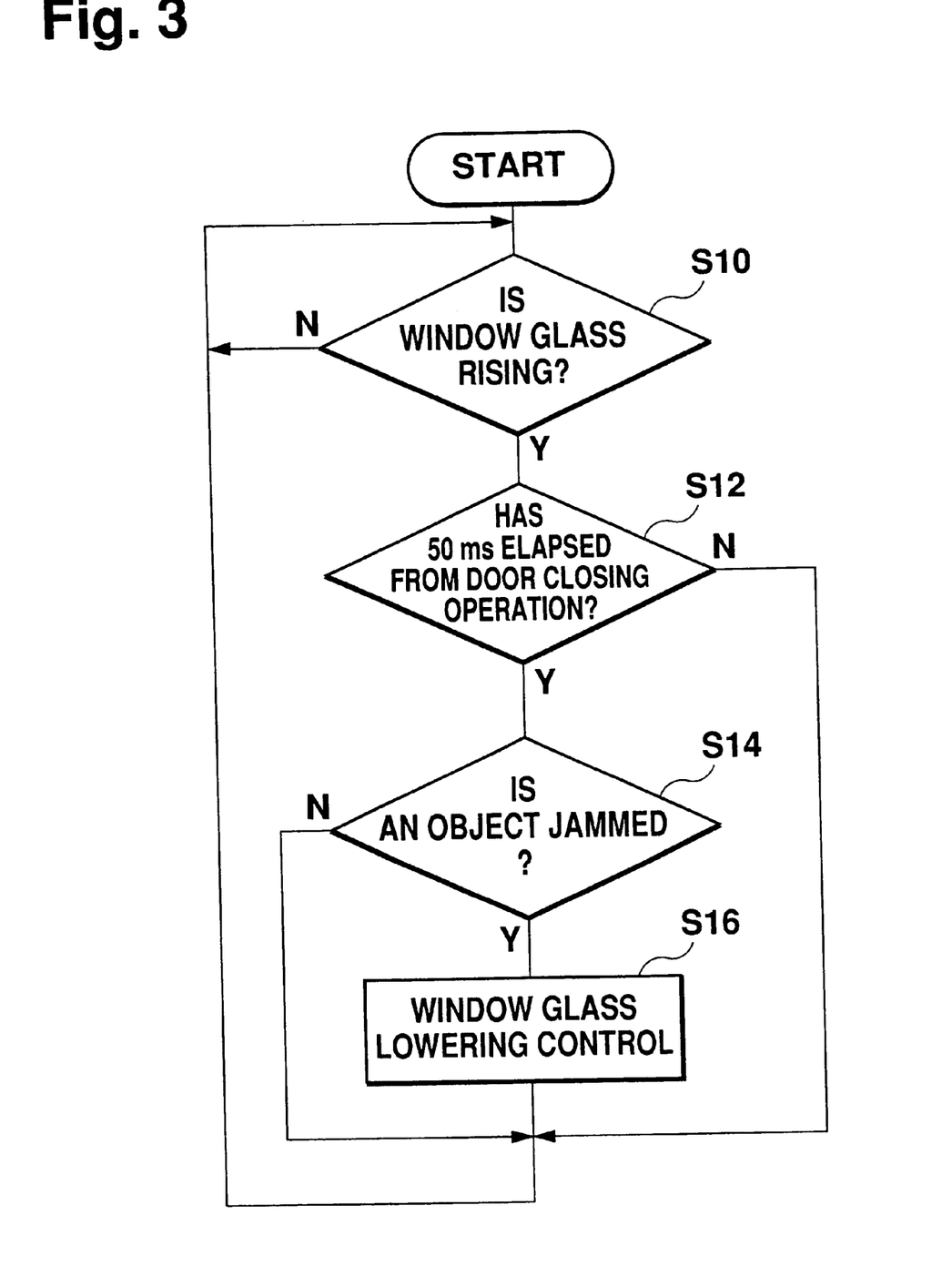
FIG. 3 is a control flowchart for the embodiment shown in FIG. 2.

FIG. 3 shows a control flowchart for a case where the door closing operation is performed while the window glass 16 is being raised to close the window. First, it is judged whether the window glass 16 is rising (S10), and the operation only continues to the next step if it is judged that the window glass 16 is rising. Next, it is judged whether 50 ms or longer has elapsed since the door closing operation was performed (S12). This 50 ms is set as a time that is slightly longer than the time it takes for the impact of the closing door to influence the fluctuation of the motor rotational speed, and is preferably set appropriate, such as according to the construction of the door. If 50 ms has elapsed after the closing operation of the door, it is judged that an object is jammed (S14). Once an object jamming is determined, a control operation is performed so that the rising window glass is lowered (S16).

In step S14, the operation returns to step S10 if object jamming is not determined. In step S12, if 50 ms has not elapsed after the closing operation of the door, steps S14 and S16 are skipped and jamming judgment is not performed. As a result, jamming determination is inhibited for a predetermined time after the closing operation of the door thereby preventing the rising movement of the window glass 16 from stopping due to incorrect judgment of object jamming caused by the door closing operation.

Figure 4:
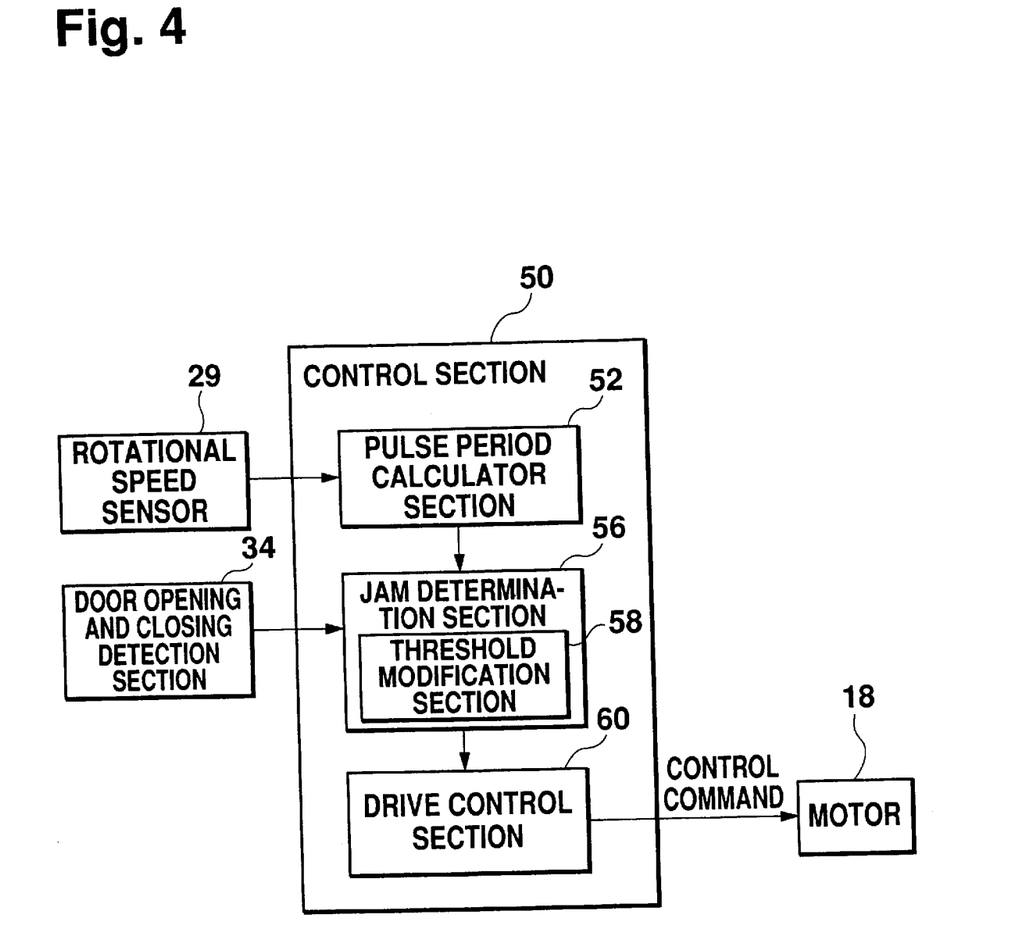
FIG. 4 is a block diagram of another embodiment of the present invention.

FIG. 4 shows a block diagram of another embodiment of the present invention. This embodiment is characterized by a modification which changes control section 30 in the above-mentioned embodiment to a control section 50. Except for control section 50, the configuration is the same as that shown in FIG. 2. In FIG. 4, corresponding parts that have been already described are given corresponding reference numerals and their description will not be repeated here. Control section 50 calculates the period of the pulses from rotational speed sensor 29 with a pulse period calculator section 52. A jamming determination section 56 calculates the load on the motor 18 from the pulse period and determines that an object is jammed if the load is greater than or equal to a predetermined threshold. On the other hand, when the door opening and closing detection section 34 detects the door opening or closing operation, a threshold modification section 58 modifies the threshold, which is used in the above-mentioned jamming determination, for a predetermined time. During this time, the jamming determination section 56 determines that an object is jammed when the motor load is greater than or equal to the modified threshold.

Once it is determined that an object is jammed, a drive control section 60 transmits control commands to the motor 18, first to stop, then to rotate in a direction opposite to that of the current rotation for a predetermined time. Thus, if an object is jammed, such as between the window glass 16 and sash 14, the movement of the window glass 16 immediately stops, then reverses so that the jammed object is released.

Thus, because the threshold has been modified, the motor load is prevented from being greater than or equal to the threshold, even if a motor load fluctuation occurs during a door opening or closing operation, thereby avoiding an incorrect judgment of object jamming. In other words, the threshold is modified to a value at which the motor load fluctuation accompanying the door opening or closing operation is not detected, thus preventing an incorrect judgment of object jamming.

Figure 5:
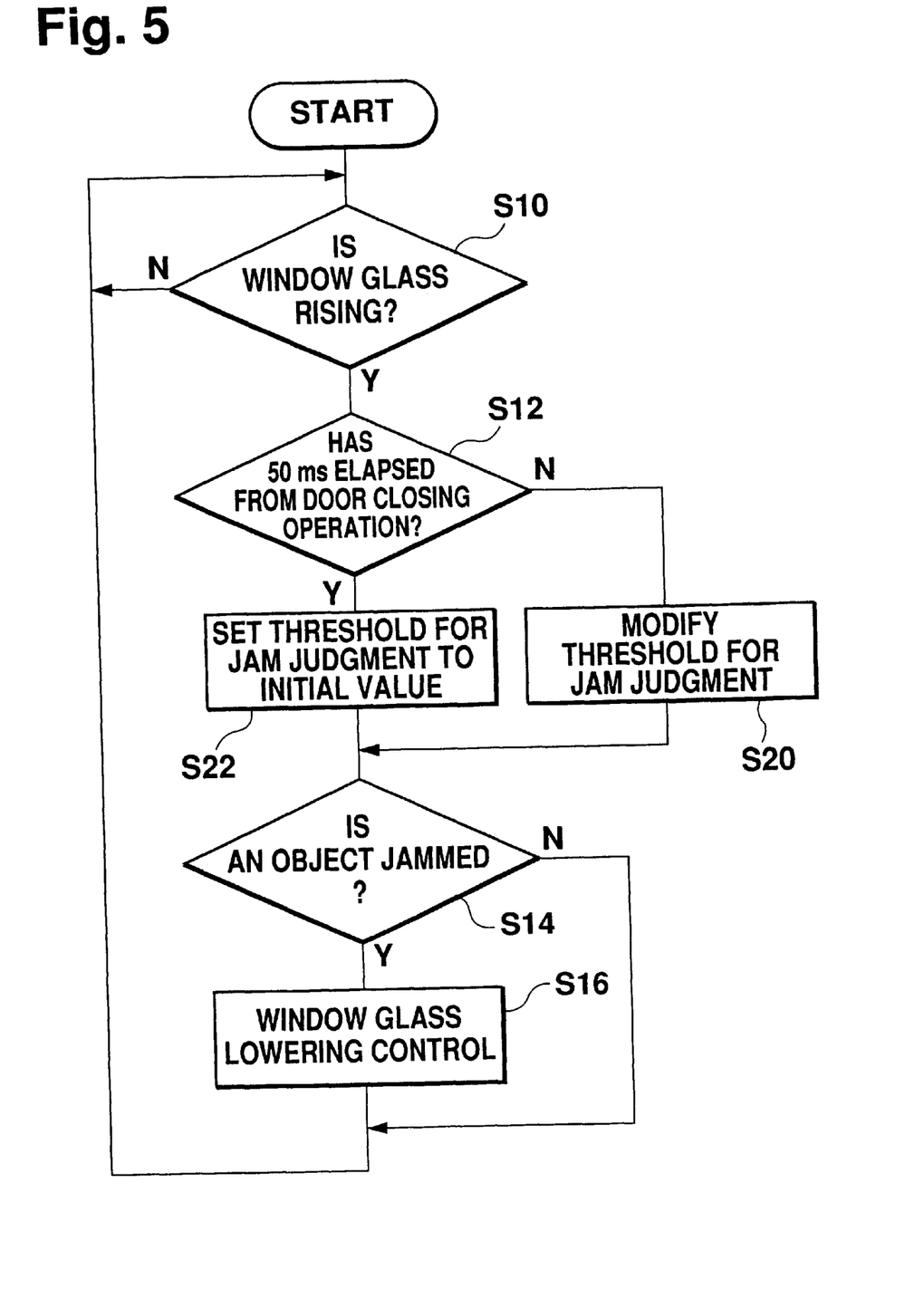
FIG. 5 is a control flowchart for the embodiment shown in FIG. 4.
Figure 6:
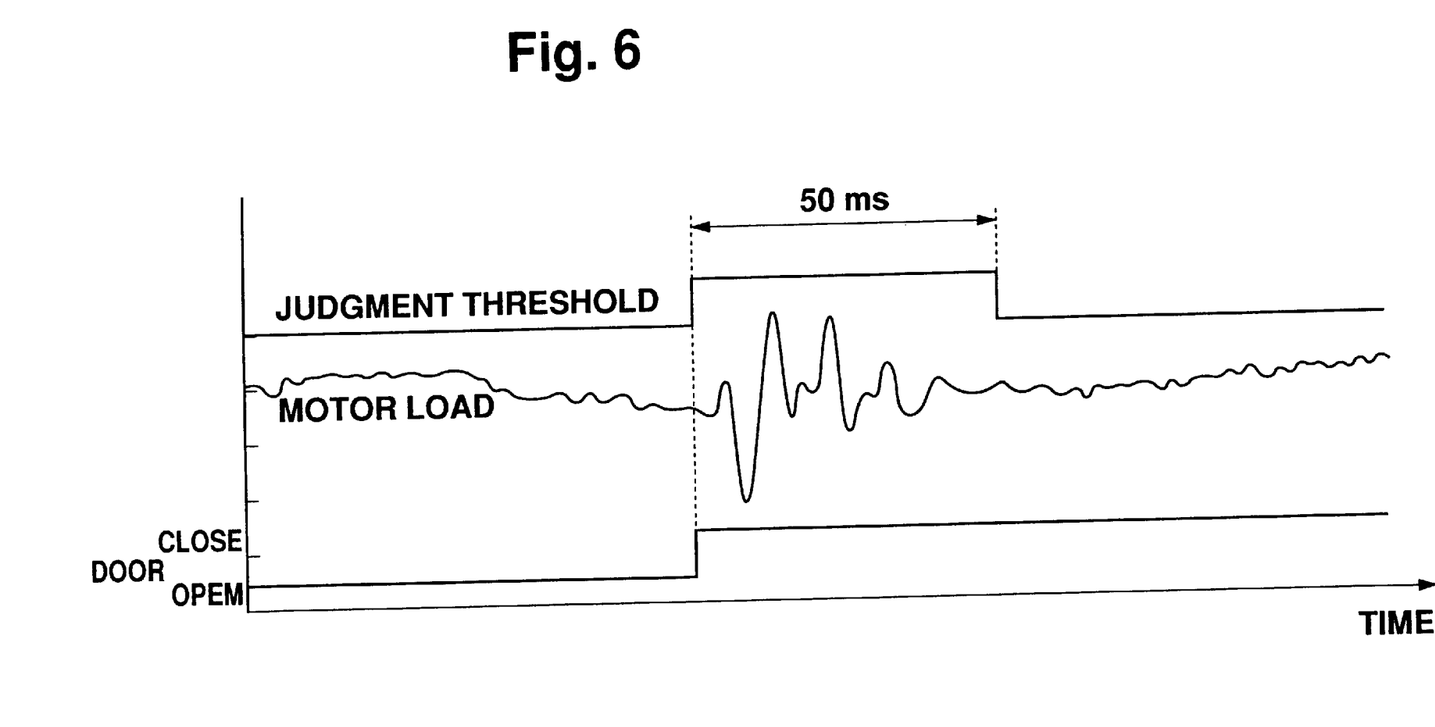
FIG. 6 shows an example of changes in a judgment threshold and detected signal in the apparatus of the embodiment shown in FIG. 4.

FIG. 5 shows a control flowchart for a case where the door closing operation is performed while the window glass 16 is being raised to close the window. FIG. 6 shows the changes in motor load, door opening and closing detection signal, and threshold used for judgment when the door is closed while the window glass is rising.

In the flowchart shown in FIG. 5, steps that correspond to those in the flowchart shown in FIG. 3 are given the same reference numerals and their description will not be repeated here. A characteristic of this control flow is that the threshold for use in jamming determination is modified (S20) if it was judged in step S12 that 50 ms has not elapsed from the time the door closing operation was performed. Namely, jamming that would normally be determined when the motor load reaches, for example, 80N, is not determined after the threshold has been modified until the load reaches 100N within 50 ms from the time the door closing operation was performed. Then, if 50 ms has elapsed from the door opening operation, the threshold is restored (S22) to its initial value (80N in this embodiment), and object jamming is judged in step S14.

As shown in FIG. 6, when the output of the courtesy switch in the door 10 changes from an open state to a closed state, control section 50 detects this leading edge and modifies the threshold only for a 50 ms interval. As a result, the fluctuation of the motor load due to the door closing operation is prevented from influencing jamming determination. Thus, a situation where rising of the window glass 16 stops is presented.

The threshold for the above jamming judgment is preferably modified by an appropriate amount since the amplitude of the fluctuation of the motor load changes, such as due to the construction of the door, and is thus not limited to the example used above (modification from 80N to 100N). In other words, it is preferable to have the threshold modified by a small amount where the load fluctuation of the motor accompanying the door opening or closing operation is not detected. It is also preferable to appropriately modify the time after the door opening or closing operation during which the threshold has been modified according to the door construction (50 ms in this embodiment). It is also preferable to set the time to as short a value as possible.

In this way, the threshold is modified in this embodiment for a predetermined time after the door opening or closing operation, thereby preventing the motor load fluctuation accompanying the opening or closing of the door from being mistaken as a change in the motor load resulting from object jamming. If the motor load exceeds the modified threshold, even during this time, object jamming judgment is performed so that a control operation can be performed promptly in response to the jamming.

In the door opening and closing operations described above, it is also possible to set, separately for the door opening operation and for the door closing operation, the threshold for object jamming judgment, the time for inhibiting jamming determination, and the time for modifying the threshold.

Figure 7:
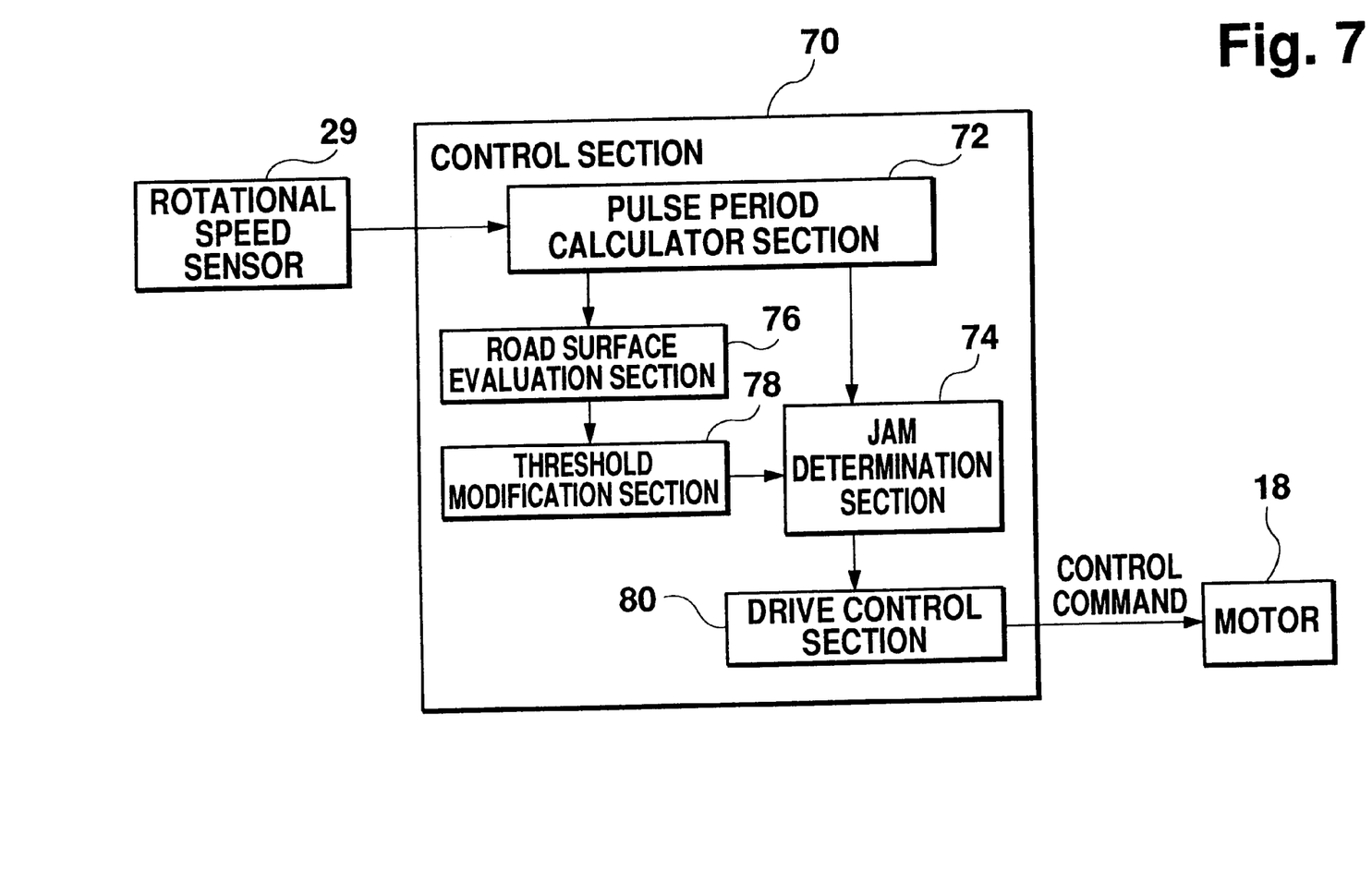
FIG. 7 is a block diagram of still another embodiment of the present invention.

FIG. 7 shows a block diagram of still another embodiment. This embodiment is characterized by a modification which changes control section 30 or control section 50 of the above-mentioned embodiments to a control section 70. The configuration, except for control section 70, corresponds to that shown in FIG. 2. Parts in FIG. 7 that have already been described are given corresponding reference numerals and will not be described again here.

The control section 70 has a configuration as shown in FIG. 7. A pulse period calculator section 72 calculate the period of pulses based on the pulses from the rotational speed sensor 29. A jamming determination section 74 determines, based on a signal of the above-mentioned pulse period, whether an object is jammed between the window glass 16 and window frame. Described in more detail, jamming determination section 74 calculates the load on the motor 18 from the period of pulses from the rotational speed sensor 29 (the load calculation method is described later), and judges that an object is jammed when the load exceeds a preset threshold.

In a road surface evaluation section 76, road surface characteristics are evaluated using the pulse period that was calculated by the pulse period calculator section 72. As the vehicle only slightly bounces when traveling on a paved road surface (smooth road surface), such as an asphalt road, a large fluctuation is not evidenced in the motor load, even when the window glass 16 is moved. Therefore, the fluctuation of the pulse period is small as shown by the broken line in FIG. 8. On the other hand, during travel on an unpaved road surface (rough road), the vehicle body bounces up and down due to the irregularities in the road surface. Because the window glass also vibrates, the motor load is also influenced and fluctuates. Thus, the pulse period fluctuates substantially as shown by the solid line in FIG. 8. Through the characteristics of this change in pulse period, the road surface evaluation section 76 evaluates the road surface characteristics. Namely, when the pulse period suddenly shortens, the road surface being traveled is evaluated as being rough when the slope of the line falling to the right becomes steep, as in part C of FIG. 8.

In jamming determination section 74, the jamming of an object is judged through the threshold which is set to correspond to the motor load. When traveling on a smooth road, the pulse period equivalent to this load is the first threshold shown by an alternate long and short dashed line in FIG. 8. The first threshold is a sufficiently large value compared to the change in pulse period during travel on a smooth road. However, there are instances where the pulse period during travel on a rough road exceeds the first threshold as shown by A and B in the figure. When judging object jamming from the first threshold, the change in pulse period due to the rough road is mistaken as object jamming at A and B. If the road surface evaluation section 76 judges that a rough road is being traveled, a threshold modification section 78 instructs the jamming determination section 74 to modify the threshold to a second threshold shown by the alternate line in the figure. The second threshold is a value that is appropriately set so as to be larger than the maximum value of the pulse period that fluctuates due to travel on the rough road and is preferably set individually according to characteristics of the vehicle.

Figure 8:
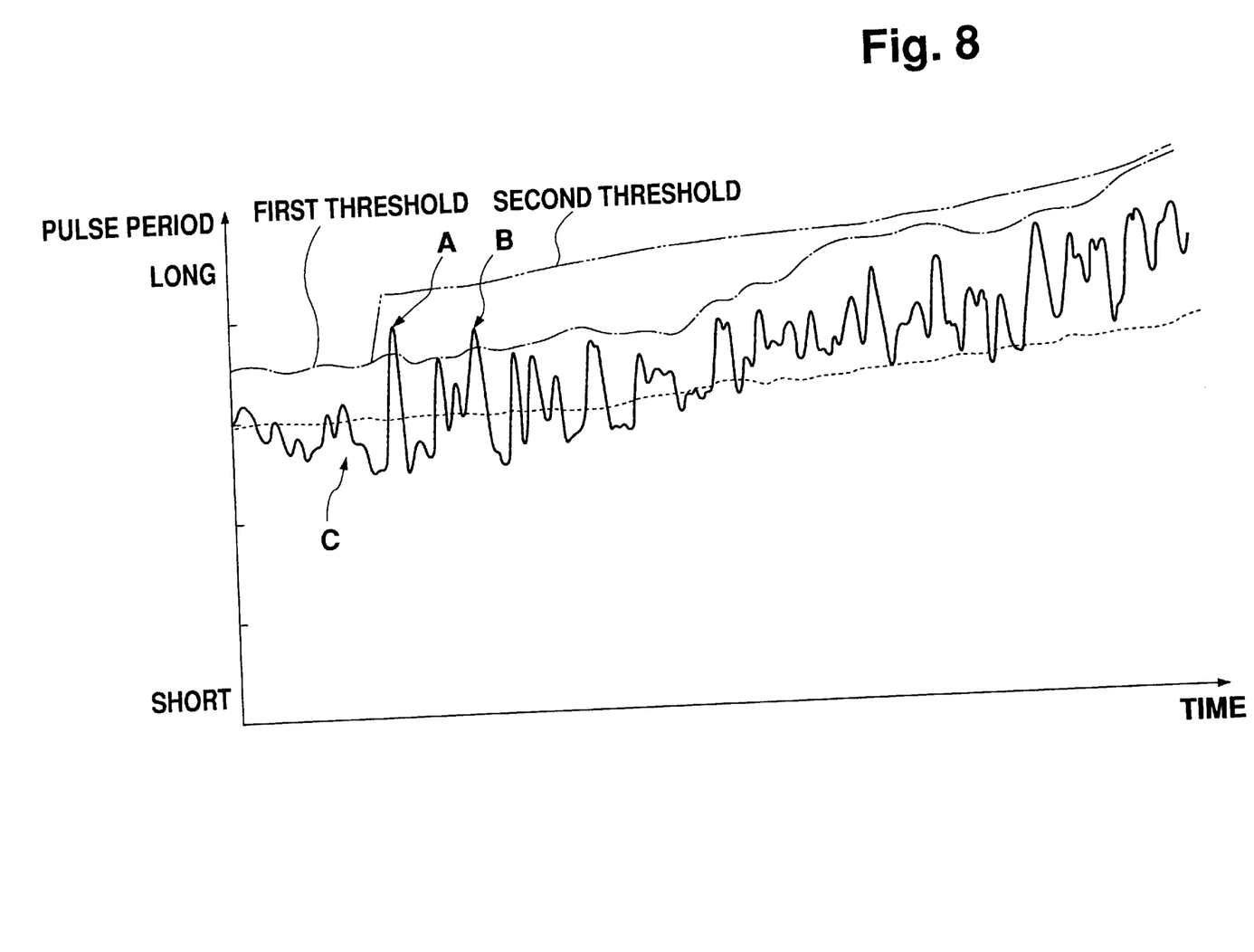
FIG. 8 shows the relationship between the thresholds and the pulse period that is associated with the load on a motor.

As described above, the jamming determination section 74 performs object jamming judgment using the first threshold when the vehicle is traveling on a smooth road and using the second threshold when the vehicle is traveling on a rough road. When it is determined that an object is jammed, the drive control section 40 transmits control commands to the motor 18, first to stop, and then to rotate in a direction opposite to that of the current rotation for a predetermined time. Thus, when an object is jammed, such as between the window glass 16 and sash 14, the movement of the window glass 16 immediately stops, then reverses, thereby releasing the jammed object.

Figure 9:
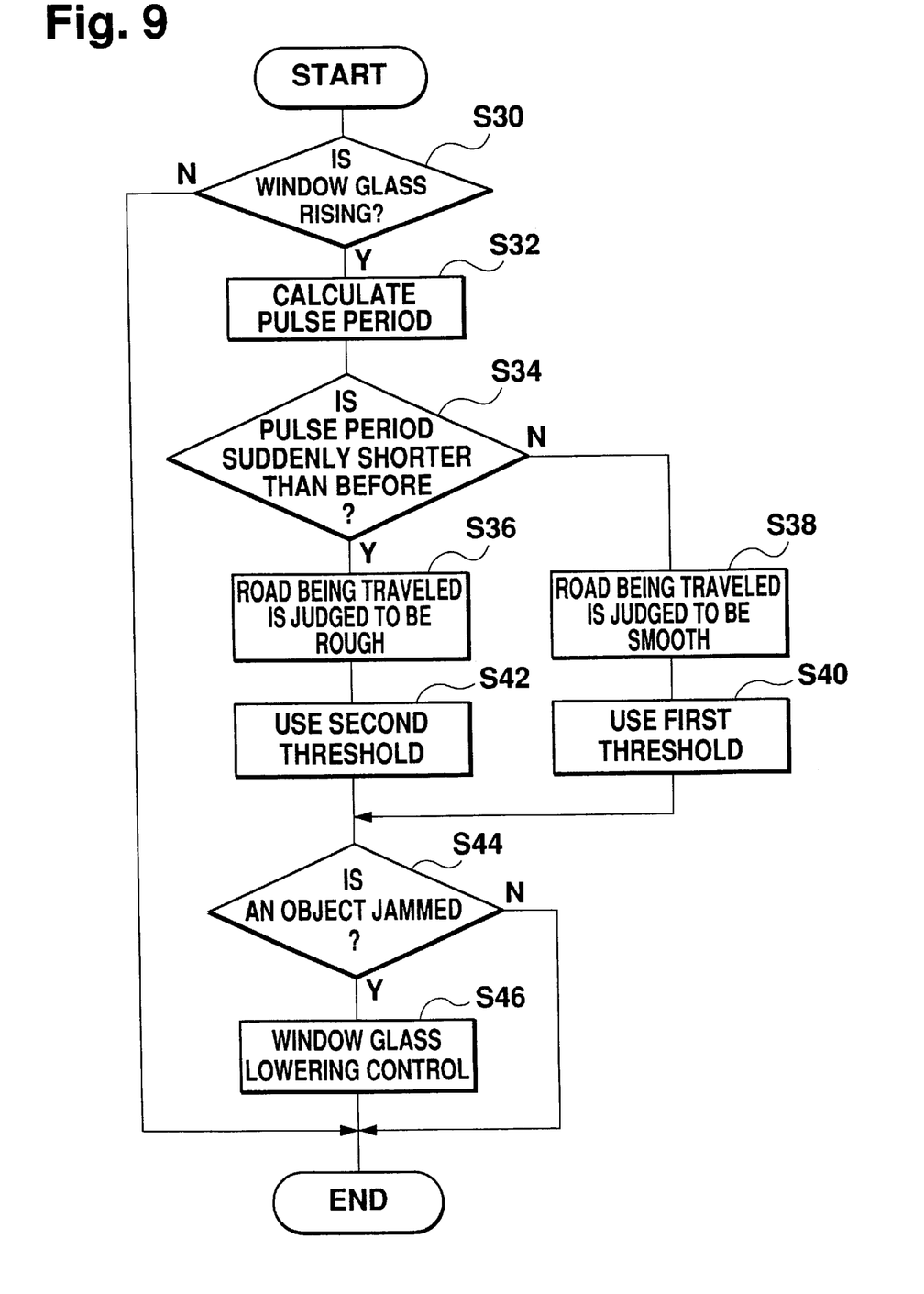
FIG. 9 is a control flowchart for the embodiment.

In FIG. 9, shows a flowchart illustrating a control of a power window that matches road surface characteristics, and in particular control when the window is being closed. First, it is judged whether the window glass 16 is rising (S30), and if it is, the pulse period is calculated (S32). Next, the calculated pulse period is compared with the preceding period then judged whether it has become suddenly shorter (S34). This step evaluates the characteristics of the road surface. As described above, because the fluctuation of the pulse period becomes large during travel on rough roads, the pulse period suddenly shortens or lengthens. Although the pulse period also lengthens due to object jamming, the pulse period simply lengthens in this case and does not shorten. Thus, the shortening of the pulse period makes it possible to judge that the vehicle is traveling on a rough road.

When the pulse period is suddenly shorter in step S34, it is judged that the vehicle is traveling on a rough road (S36). On the other hand, if the pulse period is not suddenly shorter, it is judged that the vehicle is not traveling on a rough road, namely, that the vehicle is traveling on a smooth road (S38). The first threshold is selected (S40) when the vehicle is traveling on a smooth road and the second threshold is selected (S42) when the vehicle is traveling on a rough road. Then, object jamming determination is performed (S44) with the threshold that matches the road surface characteristics. If it is determined that an object is jammed, a control operation is performed (S46) to lower the window glass 16, thereby releasing the object.

The amount of modification in the threshold for the jamming judgment is preferably modified as appropriate because the amplitude of the fluctuation in the motor load varies according to door construction and vehicle suspension characteristics.

Thus, this embodiment prevents the fluctuation in the motor load that occurs due to irregularities in the road surface, even while traveling on a rough road, from being mistaken as a change in the motor load due to object jamming. Furthermore, jamming detection can be performed, even if it has been judged that the vehicle is traveling on a rough road, since it is judged that an object is jammed if the load exceeds the modified threshold.

Figure 10:
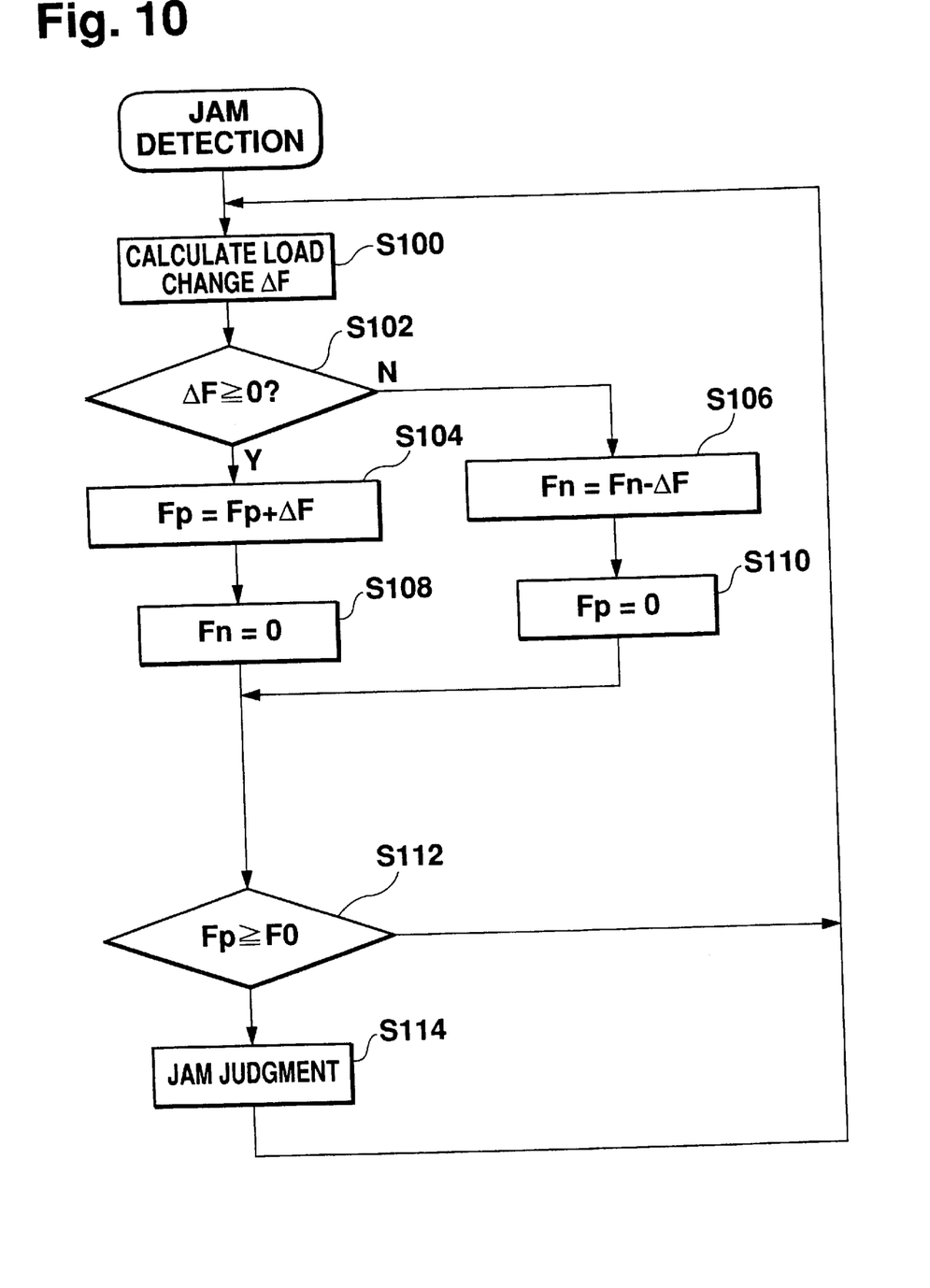
FIG. 10 is a flowchart illustrating a calculation method for motor load.

Next, the calculation of the motor load is described with reference to the flowchart shown in FIG. 10. The change in load ΔF between time $t_1$ and time $t_2$ is calculated (S100) with the following expression from pulse period $T_1$ at time t1 and pulse period $T_2$ at time $t_2$.

$$\Delta F = f_2 - f_1 = k_1 \left( \frac{1}{T_1} - \frac{1}{T_2} \right) \tag{1}$$

$k_1$ is a proportional constant, the actual value of which will be mentioned later. The sign of load change ΔF is judged (S102), and if the value is 0 or positive, load $F_p$ is calculated (S104) using the following expression.

$$F_p = F_p + \Delta F \tag{2}$$

If the sign of load change ΔF is negative in step S102, load $F_n$ is calculated (S106) using the following expression.

$$F_n = F_n - \Delta F \tag{3}$$

Furthermore, if load change ΔF is positive, load $F_n$ is set to 0 (S108). If load change ΔF is negative, load $F_p$ is set to 0 (S110).

Loads $F_p$ and $F_n$ that are summed as described above respectively indicate that the load is simply increasing and the load is simply decreasing. Hereinafter, $F_p$ will be referred to as the increasing load and $F_n$ as the decreasing load.

The increasing load $F_p$ that was calculated in the manner above is compared with judgment value $F_0$ (S112), and if $F_p$ exceeds $F_0$, it is judged that an object jamming has occurred (S114). The motor is controlled to stop so that the load does not increase further and the movement of the window is stopped. If $F_p$ is less than or equal to judgment value $F_0$, the operation returns to step S100. It is judged that an object is jammed in this embodiment as described above when the increasing load $F_p$ reaching a predetermined judgment value $F_0$. On the other hand, when load change ΔF becomes negative, the increasing load $F_p$ that is summed until that time is set to 0, thereby eliminating an apparent rise in the integrated value due to other factors. For example, a case where load change ΔF becomes positive due to a change in resistance from the position of the guide rail 15 is not summed because in this sort of load fluctuation, positive and negative fluctuations repeat and step S110 sets increasing load $F_p$ to 0 each time the fluctuation becomes negative. According to the above-mentioned control operation, an object jam is judged only when the load simply increases and reaches a predetermined value, thus preventing an incorrect judgment due to other load fluctuations.

Figure 11:
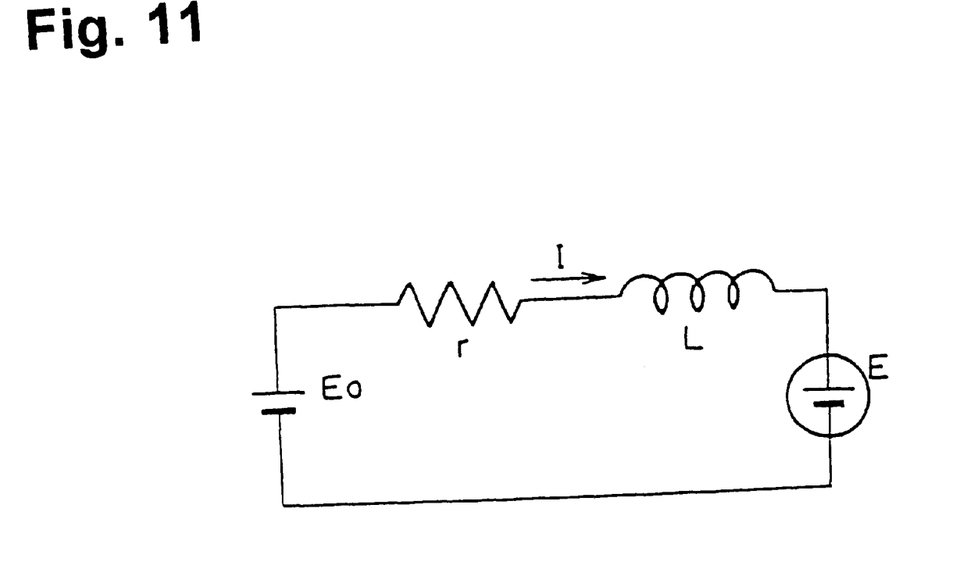
FIG. 11 shows an equivalent circuit of a typical motor.
Figure 12:
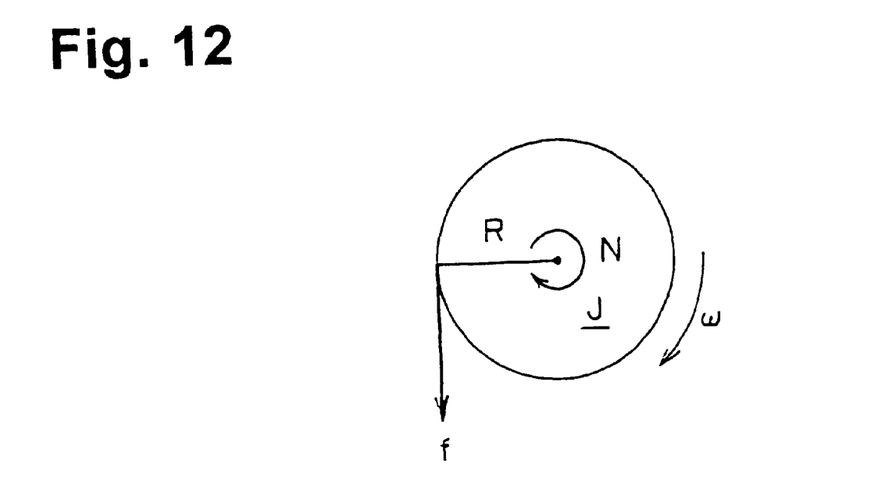
FIG. 12 shows the equilibrium between an external force on the motor and the torque generated by the motor.

Calculation of load change ΔF is described next. FIG. 11 shows an equivalent circuit for the motor and FIG. 12 shows the equilibrium of forces on the motor. In FIG. 11, a current I that flows when a voltage $E_0$ is applied to the motor of resistance r and inductance L is expressed in expression (4) with counter electromotive force E of the motor. The motor's counter electromotive force E and generated torque N are respectively expressed by (5) and (6).

$$rI + L\frac{dI}{dt} = E_0 + E \tag{4}$$

$$E = k \cdot B \omega \tag{5}$$

$$N = k \cdot BI \tag{6}$$

Here, k is a proportional constant and B is a magnetic flux density that is generated within the motor. An equation of motion (7) is obtained from the equilibrium of forces shown in FIG. 12.

$$J\frac{d\omega}{dt} = N - f \cdot R \tag{7}$$

Rewriting equation (7) yields:

$$f = \frac{N}{R} - MR\frac{d\omega}{dt} \tag{8}$$

Since the following expressions hold tune over short periods of time, $$\frac{dI}{dt} \approx 0, \frac{d\omega}{dt} = 0 \tag{9}$$

expressions (4), (5), and (6) yield:

$$f = k_0 E_0 - \frac{k_1'}{T'} \tag{10}$$

$$k_0 = \frac{kB}{rR}$$

where $$k_1' = \frac{2\pi k^2 B^2}{rR}$$

$$\omega = \frac{2\pi}{T'}$$

From this expression, it can be appreciated that external force f, namely, the load on the motor, is inversely proportional to period T. Assuming the rotational periods at times $t_1$ and $t_2$ are respectively $T_1'$ and $T_2'$, the change in external force Δf between time $t_1$ and time $t_2$ can be expressed by the following expressions.

$$\Delta f = f_2 - f_1 = k_1' \left( \frac{1}{T_1'} - \frac{1}{T_2'} \right) \tag{11}$$

In this embodiment, the change in external force Δf denotes the load change ΔF, and the rotational period T' denotes an integral multiple of the period of the output pulses from the rotational speed sensor, so it can be appreciated that expression (11) is the same as expression (1). In particular, if the pulse from the rotational speed sensor is output once for each rotation, the result is T=T' and $k_1 = k_1'$, so that expression (11) and expression (1) perfectly correspond. Furthermore, since applied voltage $E_0$ for the motor does not change within short periods of time, the first term of expression (10) is canceled in expression (11). Therefore, a judgment independent of vehicle battery voltage becomes possible.

In the above-mentioned embodiments, the threshold, the as inhibit time, and the modification time in the raising and lowering of the window glass can be individually set. Furthermore, it is also possible to perform the above-mentioned control only for one of either window raising or window lowering.

In the above-mentioned embodiments, when object jamming was determined, a control operation was performed so that the movement of the window glass 16 is first stopped, then moved a predetermined amount in the reverse direction. However, it is also possible to perform the control operation so that the window glass 16 is only stopped. In other words, it is necessary to at least stop the current window movement and prevent the current state from worsening.

Furthermore, although the motor load was calculated from the change in the rotational speed of the motor in the above-mentioned embodiments, it is also possible to determine object jamming directly from the change in the rotational speed of the motor, namely, from the change in pulse period. In this case, it is sufficient to judge the object jam by a change in pulse period that exceeds a predetermined threshold.

Furthermore, although motor load was calculated from the change in rotational speed of the motor in the above-mentioned embodiments, it is also possible to calculate the motor load using another method.

The present invention is also applicable to other than vehiclular uses, such as in motor operated window opening and closing mechanisms installed in doors in buildings, and further to automatic doors in buildings.

What is claimed is:

1. A window opening and closing apparatus using a motor for opening and closing a window glass disposed on a door, the window opening and closing apparatus comprising:

means for detecting a rotational speed of said motor;

means for detecting a disturbance factor causing an abnormal change in the rotational speed of said motor besides when the window glass jams an object, said disturbance factor being different from said rotational speed of said motor;

disturbance detection means for determining, based on the rotational speed of said motor and on said disturbance factor, that the window has jammed an object; and control means for at least inhibiting, if jamming of said object was determined, the operation of the window glass at the time the jam was determined, wherein said disturbance factor is a door opening or closing operation, and said disturbance detection means is door opening and closing detection means.

2. A window opening and closing apparatus according to claim 1 wherein said disturbance detection means includes inhibit control means for inhibiting jamming determination for a predetermined period when said door opening or closing operation was detected.

3. A window opening and closing apparatus according to claim 1 wherein said disturbance detection means determines a jam when a value that is calculated from the rotational speed of said motor exceeds a predetermined threshold, and comprises means for modifying said threshold for a predetermined period when said door opening or closing operation was detected.

4. A window opening and closing apparatus according to claim 1 wherein said door is disposed on a vehicle.

5. A window opening and closing apparatus according to claim 1 wherein said motor speed detection means comprises means for generating pulses at a period proportional to the motor speed and means for calculating the period of said pulses, the window opening and closing apparatus detects said pulse period as the motor rotational speed.

6. A window opening and closing apparatus according to claim 5 wherein the jamming-determination means calculates the load on said motor based on said pulse period and determines that the window glass has jammed due to a foreign object based on the motor load and said disturbance factor.

7. A window opening and closing apparatus according to claim 5, wherein said jamming determination means includes inhibit control means for inhibiting the jamming determination for a predetermined period when said door opening or closing operation is detected.

8. A window opening and closing apparatus according to claim 5, wherein said jamming determination means determines a jam when a value that is calculated from the rotational speed of said motor exceeds a predetermined threshold, and comprises means for modifying said threshold for a predetermined period when said door opening or closing operation was detected.

9. A window opening and closing apparatus according to claim 1 wherein the disturbance detection means calculates the load on said motor based on said pulse period and determines that the window glass has jammed due to a foreign object based on the motor load and said disturbance factor.

10. A window opening and closing apparatus using a motor for opening and closing a window glass disposed on a door, the window opening and closing apparatus comprising:

means for detecting a rotational speed of said motor;

means for detecting a disturbance factor causing an abnormal change in the rotational speed of said motor besides when the window glass jams an object, said disturbance factor being different from said rotational speed of said motor;

means for determining, based on the rotational speed of said motor and on said disturbance factor, that the window has jammed an object; and control means for at least inhibiting, if jamming of said object was determined, the operation of the window glass at the time the jam was determined, wherein:

said door is disposed on a vehicle; and said disturbance factor is an input from a road surface on which said vehicle is traveling caused by characteristics of the road surface; and said apparatus further comprises:

means for evaluating the characteristics of said road surface.

11. A window opening and closing apparatus according to claim 10 wherein:

said jamming determination means determines jamming has occurred when a value that is calculated from the rotational speed of said motor exceeds a predetermined value, and which comprises means for modifying said predetermined value according to characteristics of said road surface.

12. A window opening and closing apparatus according to claim 11 wherein said road surface characteristic evaluation means evaluates road surface characteristics based on changes in the rotational speed of said motor.

13. A window opening and closing apparatus according to claim 10 wherein said road surface characteristic evaluation means evaluates road surface characteristics based on changes in the rotational speed of said motor.

14. A window opening and closing apparatus according to claim 10 wherein said motor speed detection means comprises means for generating pulses at a period proportional to the motor speed and means for calculating the period of said pulses, the window opening and closing apparatus detects said pulse period as the motor rotational speed.

15. A window opening and closing apparatus according to claim 10 wherein the jamming determination means calculates the load on said motor based on a pulse period of said motor speed detection means and determines that the window glass has jammed due to a foreign object based on the motor load and said disturbance factor.

* * * * *